(12) United States Patent
Fackert (10) Patent No.: US 7,026,620 B2
(45) Date of Patent: Apr. 11, 2006

(54) METHOD AND DEVICE FOR THE GEOMETRICAL MEASUREMENT OF A MATERIAL STRIP

(75) Inventor: Rainer Fackert, Meinborn (DE)

(73) Assignee: IMS Messsysteme GmbH, Heiligenhaus (DE)

(*) Notice: Subject to any disclaimer, the term of this patent is extended or adjusted under 35 U.S.C. 154(b) by 0 days.

(21) Appl. No.: 10/806,884

(22) Filed: Mar. 22, 2004

(65) Prior Publication Data

US 2004/0201859 A1   Oct. 14, 2004

(30) Foreign Application Priority Data

Mar. 20, 2003 (DE) .............................. 103 12 535

(51) Int. Cl.
*G01N 21/86* (2006.01)
(52) U.S. Cl. .................................. 250/359.1
(58) Field of Classification Search ............... 250/359, 250/359.1, 560
See application file for complete search history.

(56) References Cited

U.S. PATENT DOCUMENTS

| | | | |
|---|---|---|---|
| 3,766,386 A | 10/1973 | Sivilotti et al. | |
| 4,542,297 A * | 9/1985 | Hold | 250/360.1 |
| 4,633,420 A | 12/1986 | Masanobu | |
| 6,429,944 B1 | 8/2002 | Flormann | |
| 6,480,802 B1 | 11/2002 | Flormann | |
| 2001/0012388 A1 | 8/2001 | Muller et al. | |

FOREIGN PATENT DOCUMENTS

| | | |
|---|---|---|
| DE | 197 09 992 | 10/1998 |
| DE | 198 44 756 A1 | 8/1999 |
| DE | 199 47 572 A1 | 12/2000 |
| EP | 0 627 069 B1 | 12/1994 |
| GB | 1 592 196 | 7/1981 |
| JP | 56-135106 A | 10/1981 |
| JP | 4-319612 A | 11/1992 |
| JP | 9-126746 A | 5/1997 |
| JP | 10-2730 A | 1/1998 |

* cited by examiner

Primary Examiner—David Porta
Assistant Examiner—Marcus Taningco
(74) Attorney, Agent, or Firm—Frishauf, Holtz, Goodman & Chick, P.C.

(57) ABSTRACT

The invention relates to a method for the geometrical measurement of a material strip (2), whereby the material strip (2) defines a longitudinal direction, whereby, by means of a first measuring device with at least one radiation source (6) and with at least one detector (8), the strip thickness of the material strip (2) is determined, whereby for this purpose the radiation (10) from the radiation source (6) penetrates the material strip (2) at at least one measurement point (12) arranged in the material strip (2), and the resultant weakening of the intensity of the radiation (10) is determined by the corresponding detector (8). It is proposed that, by means of a second measuring device, the transverse contour of the material strip (2) is determined. In this situation, the measurement of the strip thickness and the transverse contour is effected at the same place on the material strip. The measured values of the thickness measurement are corrected with the measured values of the transverse contour.

The invention also relates to a device for the performance of the method.

20 Claims, 5 Drawing Sheets

METHOD AND DEVICE FOR THE GEOMETRICAL MEASUREMENT OF A MATERIAL STRIP

The invention relates to a method for the geometrical measurement of a material strip, as well as a device for the performance of the method.

With cold-rolling and hot-rolling, a metal plate in the form of a metal strip is produced, which extends in a longitudinal direction (direction of conveying) and a transverse direction. In addition to the material characteristics, it is the geometry of the material strip which forms the basis for quality control and for such correction as may be necessary of the rolling parameters in a process control system. For a continuous recording of the quality, as well as for the possibility of the on-line correction of the rolling parameters, it is therefore necessary for appropriate measurements to be made during the rolling process which will provide an indication about the geometry of the metal strip. Interesting values in this respect are, inter alia, the thickness of the strip, the strip width, and the flatness of the material strip. In addition, the absolute position of the material strip is of interest for the process control, in particular with "flying" material strips.

For measuring the strip thickness a method is known with which the high-energy electromagnetic radiation which is produced from a radiation source, such as X-rays or gamma radiation, penetrates the material strip essentially perpendicular to the strip surface, whereby the intensity of the radiation is weakened as a function of the strip thickness. In this case, the expression "essentially perpendicular" means that the path of the beam exhibits an acute angle with the surface normals of the material strip. The weakening of the radiation is measured by an appropriately-arranged detector. This method for determining the strip thickness forms the starting point for the present invention.

To determine the strip thickness at different points over the width of the material strip (strip thickness transverse profile) the principle is further known of providing several radiation sources distributed over the width of the material strip, with the corresponding detectors. The function principle of such a strip thickness measuring arrangement can be derived from DE 199 47 572 A1.

A disadvantage with the strip thickness measuring system described above is the fact that unevenness basically falsifies the measurement, since every uneven point leads to a longer or shorter path being run through within the material by the radiation beam, so that the measurement shows a greater or smaller strip thickness than accords with reality. Unevenness cannot be detected with the measuring method described.

To determine points of unevenness, or, more generally, to determine the surface geometry of the material strip, a proposal is made in DE 199 47 572 A1 for a measuring system based on the strip thickness measuring technique described heretofore. In this situation, provision is made for at least two radiation sources, the radiation from which penetrates the material strip. In addition, provision is made for a plurality of detectors, which in each case are aligned onto a radiation source. In this situation, the radiation sources and the detectors are arranged in such a way that measurement points are formed which are distributed over the width of the material strip, each of which is evaluated by means of two detectors with different alignments. To do this it is necessary for the beam paths of two radiation sources which are surveyed by the corresponding detectors to intersect at one measuring point. With these measured values the rise values of the material strip at the measurement points can be determined. Accordingly, the transverse and longitudinal contour of the material strip can in turn also be calculated by interpolation.

A disadvantage with this latter method is the fact that the measurement points described are fixed in position, so that any displacement of the material strip perpendicular to its surface leads to a corresponding falsification of the measurement result. Such displacement arises in particular with flying strips, which are not supported and guided in the area of the measurement points. At those locations, displacements occur with a frequency, for example, of approx. 4 to 6 Hz. The change of location can in this situation relate to changes in the transverse profile as well as the position of the strip as a whole. In the most unfavourable case, it may occur that the measuring point lies outside the material strip. In addition, the interpolation required leads to a system-incurred interpolation error in cases of measurement at discrete measurement points.

One possibility for the precise measurement of the surface geometry is provided by optical methods, which project light beams in a specific manner onto the surface of the material strip, and which, by means of a camera-supported measurement of the reflections, allow for conclusions to be drawn about the surface geometry.

A method of this kind is represented in DE 197 09 992 C1. In this case, a plurality of lines are generated on the surface of the material strip by means of a light source, which are acquired by a CCD camera and are compared to a reference pattern. Thus the uneven points of the material strip can be calculated on the basis of the deviation of the camera image from the reference pattern. A similar measuring principle is the object of EP 0 627 069 B1. While with these two methods a precise determination of the surface geometry is guaranteed, a strip thickness measurement is not possible.

DE 199 47 572 A1 provides a formulation for increasing the performance ability with respect to the scope of the information determined in respect of the geometry of the material strip. In this case, use is made of the strip thickness measurement described in the preamble in parallel with an optical measuring method based on projection in order to determine the surface geometry of the material strip. A parallel operation of this nature cannot alone lead to an optimisation of the measuring result.

The invention is based on the technical problem of conceiving and further developing the known method in such a way that the performance capability of the measuring system is increased with regard to resistance to error and information dissemination.

The technical problem described is resolved initially by a method with the features discussed hereinabove.

According to the invention, this relates to a method with which, by means of a first measuring device, the strip thickness is determined at at least one measuring point arranged in the material strip, and with which, by means of a second measuring device, the spatial position and alignment of the material strip is determined relative to a reference position, and with which a correction to the measured values of the first measuring device is carried out by means of the measured values of the second measuring device.

It is therefore recognised that the two methods, previously applied separately, can be combined with one another in order to attain a higher degree of precision of the measured values and therefore greater robustness of the measuring method. In addition to this, according to the invention, not only is the strip thickness more precisely acquired, but, in addition, the precise spatial position in the space concerned can be acquired, including the longitudinal and transverse profiles of the material strip. The whole of the information can then be used for controlling the manufacturing process of the material strip.

In a preferred manner, by means of the first measuring device a measurement of the strip thickness is carried out on the basis of the penetration of the material strip with high-energy electromagnetic radiation. By means of the second measuring device, likewise in a preferred manner, the transverse contour, i.e. the shape and position of the material strip in the transverse direction, is acquired by optical aids, as well as, if appropriate, the longitudinal contour at the same time. In this situation, both measurements are for preference carried out at the same point on the material strip.

Accordingly, for one point on the material strip information is provided on the one hand with regard to the strip thickness, and, on the other, with regard to the transverse contour (shape and spatial position). This basically offers the possibility of optimising the strip thickness measurement, the measured values of which would be falsified in the event of unevenness arising in the transverse profile, as well as due to changes in the position of the material strip in space relative to the measuring devices. With the measured values of the second measuring device, the unevenness and positional changes are known, so that the measured values from the first measuring device can be corrected accordingly. This means that the measured values can be allocated to individual real positions in the material strip, even if the material strip is located at a distance away from the reference position.

The determination of the transverse contour is effected in a preferred manner by a projection device initially projecting a line onto the surface of the material strip essentially perpendicular to the longitudinal direction. By means of a camera, the projected line is then acquired in a pixel matrix. With a flat material strip, this line is a straight line, and is bent and/or displaced if the material strip exhibits unevenness and/or deviates in its spatial position from a reference position or a reference line. From the change in the projected line which is detected by the camera in the pixel matrix, the longitudinal and transverse contour, i.e. the shape of the material strip, can be calculated, as well as the spatial position of the material strip in relation to a reference line.

In this situation it is preferred if the line runs along the area of the material strip in which the measurement points of the first measuring device are arranged. As a result, an optimum result is achieved for the correction of the measured values from the first measuring device by means of the measured values of the contour of the material strip.

A further preferred embodiment of the present invention lies in the fact that the projection device projects a grid of lines spaced at a distance from one another in the longitudinal direction of the material strip. The line grid is detected by a camera and, on the basis of the evaluation of the shape of the line grid, the shape and spatial position of the material strip is determined at least partially in the area of the material strip encompassed by the line grid. Accordingly, the inherently-known measuring method of the line grid is combined with the measurement from the first measuring device. By means of the acquisition of the line grid, a larger area is acquired around the measurement points of the first measuring device, with a high degree of accuracy.

In a preferred manner, the line grid is acquired and evaluated in a double manner. On the one hand, as explained heretofore, the entire grid is acquired and from this the strip contour and position of the material strip is acquired in a larger area. On the other, the grid is projected in such a way that one of the lines runs along the measurement points of the first measuring device. This line is then acquired separately by a further camera and evaluated in the manner described heretofore. In other words, a measurement of flatness of the material strip is carried out by an evaluation of the grid as a whole, while the evaluation of the individual line achieves a correction of the measured values from the first measuring device.

The particular advantage of the latter embodiment of the invention lies in the fact that, on the one hand, only one projection direction is needed in order to carry out two different measurements, and that, on the other, for these two measurements only one area of the material strip needs to be kept clear of dirt contamination.

A further embodiment of the measuring method is described hereinafter, which is inherently independent of the invention described heretofore. With the aid of the line measurement carried out by the second measuring device, but for preference with the aid of at least two additional cameras, the spatial positions of the edges of the material strip are detected. These positions are corrected with the strip contour determined by the same or another measurement, in order to determine the actual band width. Specifically, in the event of a camber in the transverse direction the measuring methods detect edge positions of which the distance between one another reproduces a width of the material strip which is in fact too small.

All known methods can be drawn upon as measuring methods for the determination of the edge contour. In particular, the edge contour can be determined by the methods disclosed in the present Application, in other words by a measurement of the material strip with the aid of the first measuring device with radiation paths in two different directions making use of two radiation sources and in each case of two detectors for each measurement point. Alternatively, the edge contour is detected by optical measurement by means of the second measuring device, as described heretofore.

The determination of the transverse contour with the aid of the second measuring device making use of a single light line, for preference in the area of the measurement points of the first measuring device, contains the following method steps:

Detection of the projected line in the pixel matrix,

Extraction of the projected line from the pixel matrix and determination of the corresponding pixel co-ordinates, Transformation of the pixel co-ordinates into object co-ordinates, Interpolation on equidistant support points and referencing relative to the reference position or reference line respectively.

This is a particularly rapid method for the detection and extraction of lines in a pixel matrix, and a particularly simple method of determining the object co-ordinates relating the material strip. The term "object co-ordinates" is understood to mean in this situation the co-ordinates relative to a reference line or zero line or even zero point located in the real manufacturing surroundings. The method is explained in detail in the figure description.

According to a further teaching, which acquires independent significance, the problem described heretofore is resolved by a device which is explained in greater detail in the following description of an embodiment.

The invention is explained hereinafter in greater detail on the basis of drawings representing only one embodiment.

Figure 1:
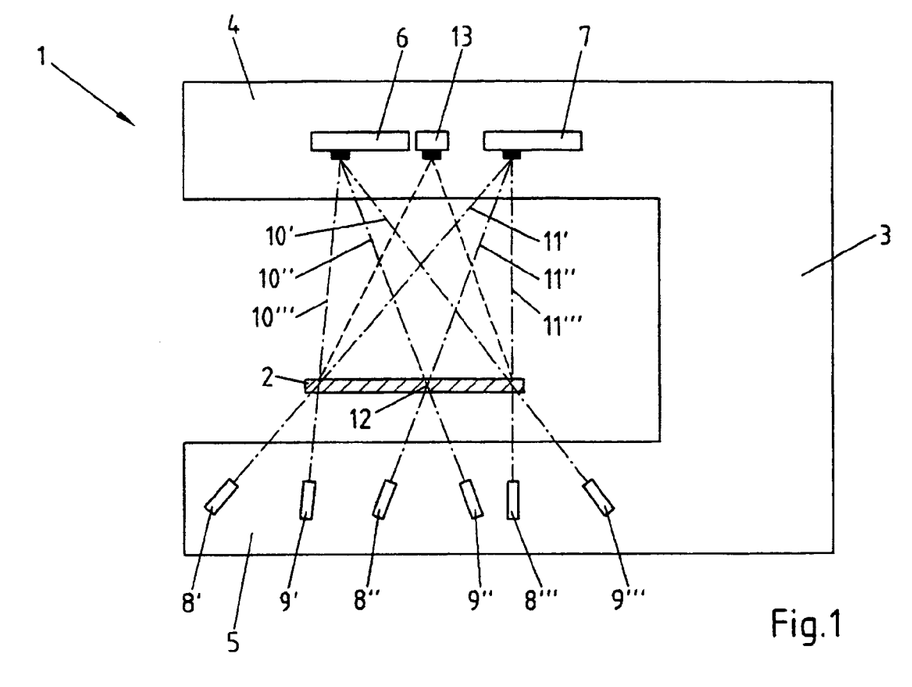
FIG. 1 A first embodiment of a device according to the invention for the performance of the method according to the invention, in a schematic side view in the longitudinal direction, FIG. 2 The device according to FIG. 1 in a schematic side view in the transverse direction, FIG. 3 A second embodiment of a device according to the invention for the performance of the method according to the invention, in a schematic side view in the longitudinal direction, FIG. 4 The device according to FIG. 3 in a schematic side view in the transverse direction, FIG. 5 A third embodiment of a device according to the invention for the performance of the method according to the invention, in a schematic side view in the transverse direction, FIG. 6 A fourth embodiment of a device according to the invention for the performance of the method according to the invention, in a schematic side view in the longitudinal direction, FIG. 7 Visualisation of intermediate values in the determination of the pixel co-ordinates corresponding to the projected line, and FIG. 8 The result of the transformation in object co-ordinate.

FIG. 1 shows a first embodiment of a device 1 according to the invention for the performance of the method according to the invention, whereby the material strip 2 in this representation is conveyed out of the plane of the drawing or into the plane of the drawing respectively, i.e. in the longitudinal direction. The device 1 exhibits a housing 3, which in an essentially D-shape is provided with two limbs 4, 5, encompassing the material strip.

A first measuring device is provided for the determination of the strip thickness. The embodiment represented of the first measuring device is also suitable for detecting the transverse contour of the material strip 2, which does not play a particular part with regard to the representation of the solution according to the invention, however. Hereinafter, therefore, it is initially assumed that the first measuring device only provides measured values for the determination of the strip thickness.

In the present case, the first measuring device exhibits two radiation sources 6, 7, and a row of detectors 8, 9. The radiation 10, 11, created in each case by the radiation source 6, 7, penetrates the material strip 12 at different measurement points 12, which for preference are arranged in a line perpendicular to the longitudinal direction. In a particularly simple embodiment, the first measuring device can also exhibit only one single radiation source 6, 7, and one single detector 8, 9.

The method for the determination of the strip thickness by means of evaluation means, not shown, from the measured values of the detectors, i.e. from the weakening of the intensity of the radiation, is known from the prior art cited heretofore, such that this does not need to be explained any further.

Represented in FIG. 1 is a second measuring device, which is provided for the determination of the transverse contour of the material strip. The second measuring device exhibits a projection device 13, which in the present case is designed as a laser source, in particular as a line laser. The projection device 13 can also contain other light sources, and in the simplest case can operate in the manner of a slide projector.

The projection device 13 projects a line onto the surface of the material strip 2, which is detected by a CCD camera 14 in a pixel matrix. For this purpose the camera 14 is arranged at a distance from the projection device 13, or pivots about a corresponding angle.

The projected line with flat material strip 2 is a straight line, and the projected line runs perpendicular seen towards the surface of the material strip 2, which is optimally aligned in space and therefore is congruent to the measurement point 12 or the measurement points 12 of the first measuring device respectively. This can be seen in FIG. 2 in conjunction with FIG. 1. This congruency is retained even with material strips with fluctuating movement, and so leads to particularly reliable operation.

Figure 2:
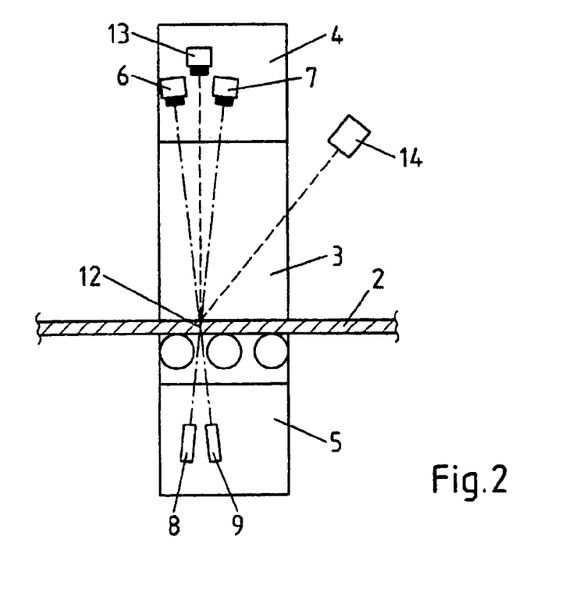

The congruence described heretofore between the projected line and the measurement point 12 is the precondition for both measurements to relate to the same point of the material strip 2, so that the calculation correction of the measured values of the one measuring device, described in the general part of the Description, is made possible by the evaluation of the measured values of the second measuring device.

Some particularly interesting possibilities for the correction of the measured values are to be anticipated if the measurement of the strip thickness, as already indicated, also provides information regarding the transverse contour. Specifically, essentially redundant measured values regarding the transverse contour are present, which, as appropriate, can lead to an increase in the mean measurement precision. For this purpose provision is made in the first instance for measured values to be recorded at a large number of measurement points 12, which are arranged transverse to the longitudinal direction in the material strip 2. The measurement points are acquired by at least two detectors 8, 9, which in each case detect radiation at different spatial angles. Series of measurements are taken at predetermined intervals, which essentially acquire all the measurement points 12. From the series of measurements, the rise in the material strip 2 is calculated for each measurement point 12 acquired. By interpolation the transverse contour of the material strip 2 can then be calculated, as is known from the prior art.

While the calculation of the strip thickness from the measured values from the detectors 8, 9, is known from the prior art, hereinafter a particular fast and reliable method is presented for the calculation of the transverse contour of the material strip 2.

Figure 3:
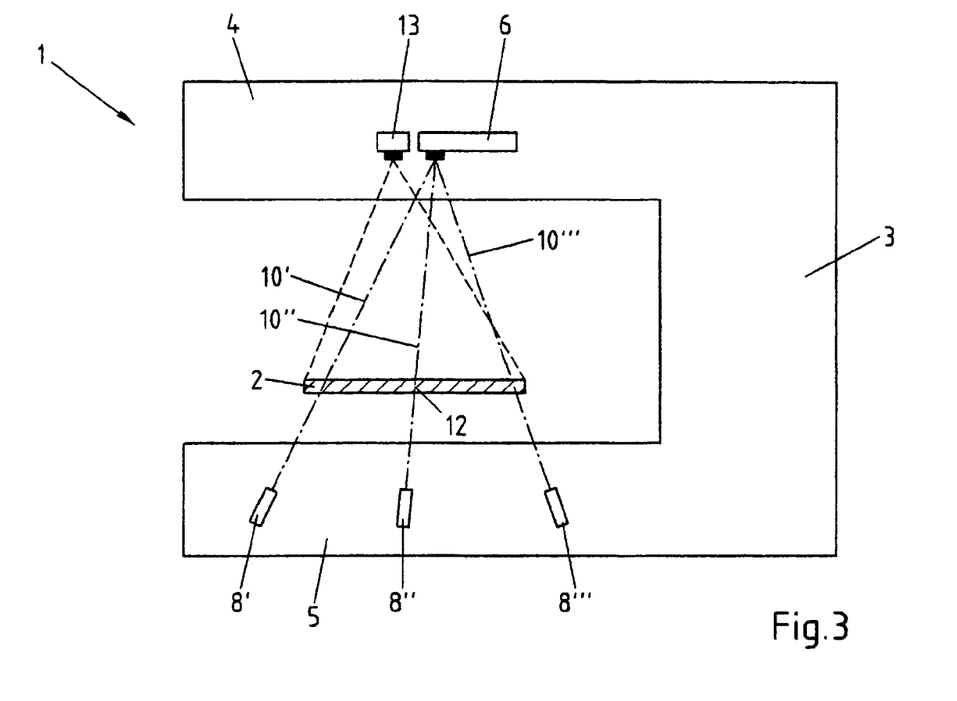
Figure 4:
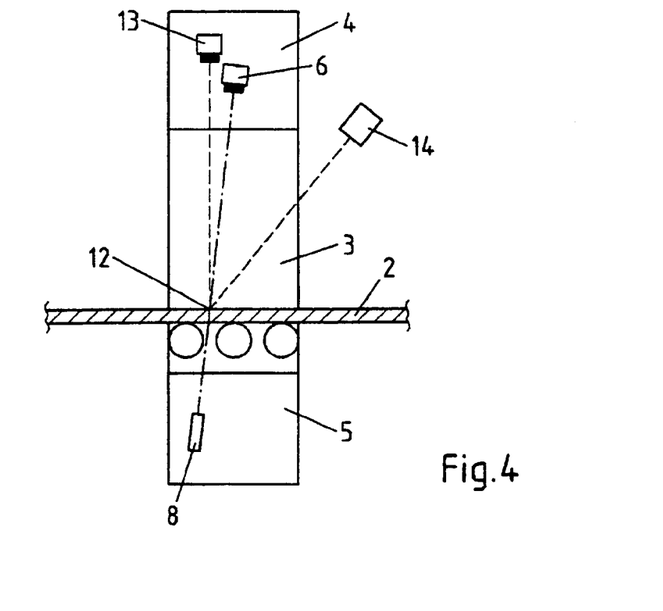

FIGS. 3 and 4 show a further embodiment of the present invention, which essentially concurs with the first embodiment. Accordingly, the same reference numbers designate the same components, as they have already been described on the basis of FIGS. 1 and 2.

The difference is that each measuring point 12 of the first measuring device is acquired by only one detector 8, i.e. only one reduction value is measured. To do this, according to FIGS. 3 and 4, provision is made in this case for only one radiation source 6 for the entire measuring range.

A further variant, not represented in FIGS. 3 and 4, consists of the fact that at least two radiation sources are provided for, which in each case comprise part areas of the material strip 2, and in each case one part of the detectors 8 is aligned onto one radiation source.

The arrangement according to FIGS. 3 and 4 is sufficient to determine the strip thicknesses precisely. Specifically, on the basis of the measured values of the second measuring device the precise spatial location of the material strip can be determined within the geometric connection between the radiation source and the individual detector in each case.

Accordingly, the measured values from the detectors 8 can in each case be allocated to a precise position in the material strip, regarding which the rise in spatial terms is also known. From this the actual thickness can be derived from a reduction measured value of the detector 8.

Figure 5:
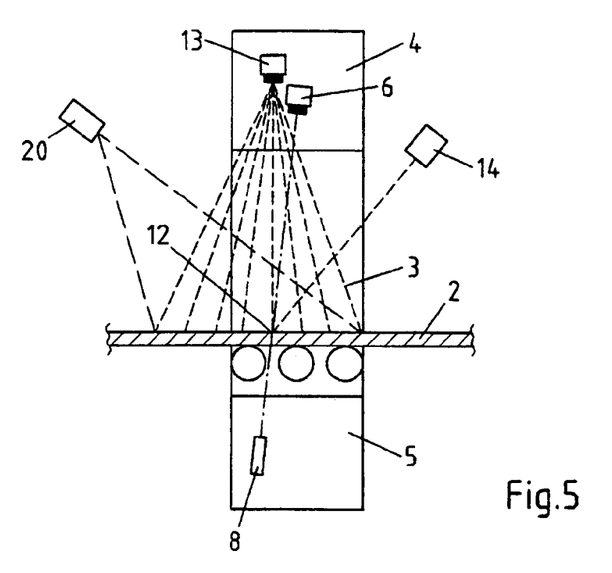

FIG. 5 shows a further embodiment of the invention. Here too, the same reference figures designate the same parts as have already been described on the basis of FIGS. 1 to 4.

In distinction to the previous embodiments, the projection device 13 projects a grid of individual lines onto the surface of the material strip 2. This is represented in diagrammatic terms by a plurality of broken lines, which end on the surface of the strip. The line grid is detected in its entirety by a camera 20 and then evaluated with appropriate evaluation means. As a result, an inherently known evenness measurement can be carried out, which determines with a high degree of precision the longitudinal and transverse profile of the material strip as well as its position in space.

This evenness measurement may be sufficient on its own to correct the measured values from the first measuring device also, i.e. to process the reduction measured values of the detectors to provide precise strip thicknesses.

However, the rapidity of the evenness measurement over a substantial range of the material strip 2 is often less than the measurement of the reduction values. Accordingly, in an advantageous manner, the camera 14 already described heretofore is used in order to evaluate one of the lines of the grid separately. To do this, the line grid is positioned in such a way that a line, for preference arranged in the middle, is arranged in congruency with the measurement points 12 of the first measuring device. The middle line is then evaluated in the manner described heretofore, whereby in this case a smaller volume of data is incurred and the rapidity of the evaluation is sufficient for a correction of the measured values of the first measuring device.

Figure 6:
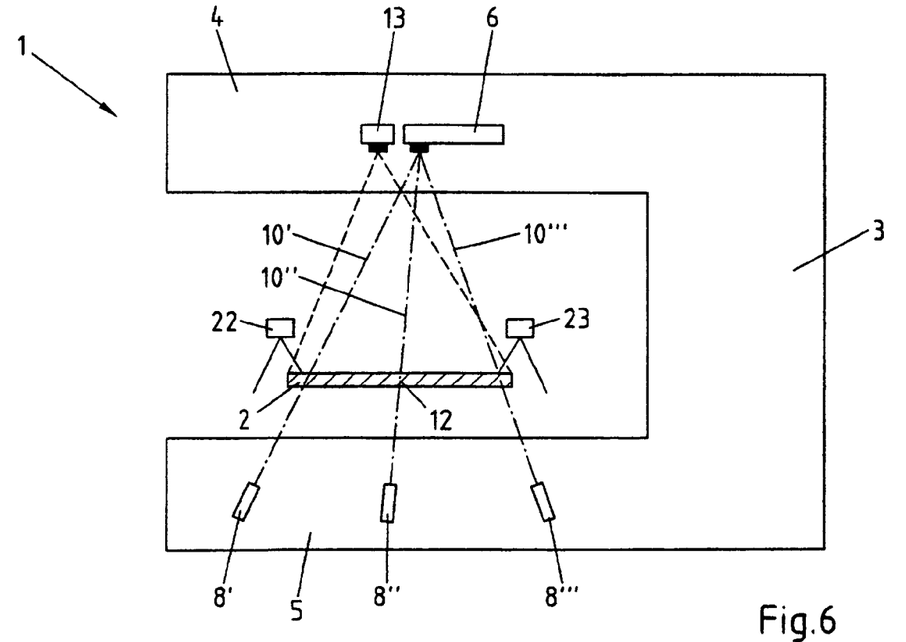

FIG. 6 shows a fourth embodiment of the present invention, which essentially concurs with the second embodiment. In addition to this, provision is made for two cameras 22 and 23, which measure the positions of the edges of the material strip 2. From the absolute edge positions, the strip width can be determined as follows: If the strip camber in the transverse direction is taken into consideration, i.e. the transverse contour, the absolute values of the edge positions can be converted into an actual edge width with a non-cambered surface. Accordingly, the strip width can be determined in a substantially more precise manner that has been possible heretofore.

In this situation, it is not the nature of the determination of the transverse contour which is of significance. This can be measured and calculated on the one hand by the first measuring device of the first embodiment by means of two detectors 8 and 9 in each case for a measurement point 12. On the other, the optical methods of the second measuring device can be used, as they have been described heretofore. Accordingly, the precise determination of the edge width has an independently inventive character regardless of the combination of first and second measuring device.

Hereinafter a possible evaluation of the measured values of the camera 14 is explained, for the determination of the line course (transverse contour) relative to a reference line or reference position.

The first method step for the calculation of the transverse contour is the detection of the projected line in the pixel matrix. What is meant by this is that only those pixels are intended to remain in the pixel matrix which describe the projected line. Because the extension of the projected line in the pixel matrix is known approximately, the detection of the projected line in the present case is particularly easy. In the present case the situation is that the projected line extends in the pixel matrix in the X-direction. Accordingly, the projected line represents a local raising of the grey value path in each gap of the pixel matrix, which can be detected by a filter which is applied gap by gap onto the pixel matrix.

The filter principle consists of an upper and lower area being determined initially for each individual pixel, seen in the direction of the gap. The upper and lower area respectively are arranged symmetrically to the pixel being observed and removed at a distance ($F_a$: Filter start) from the pixel being observed. The areas extend as far as a specific distance from the pixel being observed ($F_e$: Filter end). In particular, the value of $F_a$ depends essentially on the width of the projected line in the pixel matrix in the gap direction. For the two areas, the mean values are now formed by means of the pixels contained in these areas. If the grey value of the pixel under consideration is higher by a predetermined value ($S_{threshold}$) than the greater of the two mean grey values, the pixel under consideration is selected; otherwise, it will be deleted.

The resulting image contains only the selected pixels which are essentially grouped together in the area of the projected line as well as scattered individually over the entire image. Because grouped areas are comparatively easy to detect, in a following method step possible holes which may be present in the projected line are filled up. Given that these are vacancies, it is to be expected that the gaps essentially make up one pixel. Accordingly, an examination is made of the entire image as to whether two pixels are present in the horizontal, vertical, or diagonal direction between which there is a gap. This gap, or the corresponding pixel respectively, are then selected accordingly. Naturally, further strategies for filling gaps can be applied, which for preference are adapted to the line shape which is to be anticipated. A further example is the filling of the gap between two offset pixels.

After the filling as described of gaps which may be present, what is referred to as a weighting image is created. In this situation, referred to each pixel is the number of selected pixels associated with it. Accordingly, with the appropriate filtering only the large grouped pixel areas remain, whereby the projected line, as anticipated, forms the largest grouped pixel area, and therefore is unambiguously detectable from the pixel matrix. The detection of the projected line is therefore concluded.

Within the framework of the extraction provision is now made, in the further course of the method, for the vectors of the projected line in the pixel matrix to be determined for each individual X-value (pixel co-ordinates). If the projected line in the pixel matrix were only one pixel wide, in each gap there would only be the highest grey value to be determined in each gap, as a result of which the pixel co-ordinates would be known.

Figure 7:
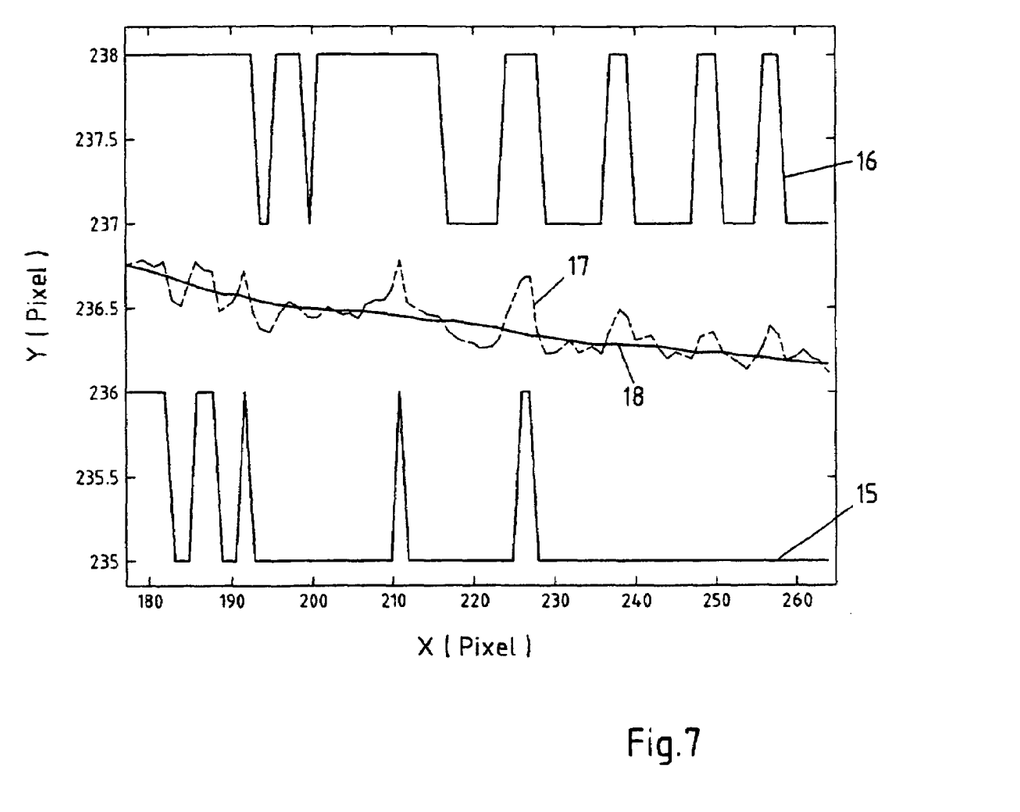

It is however a fact that the projected line in the pixel matrix exhibits a certain width. In order nevertheless to come to the desired vectors, in the first instance the start position and end position of the projected line in each gap is determined. This is shown in FIG. 7. The lower curve 15 forms the start position and the upper curve 16 forms the end position.

In order to calculate as exact a Y-value as possible in each gap, recourse is made here to the original image, and specifically related only to the upper limit values. The resultant calculation of the projected line shows the curve 17. Curve 18 shows the curve 17 after a filtering by means of a median filter. Depending on the application situation, further filterings come into consideration in this situation, which are not gone into any further at this juncture.

Accordingly, the vectors which describe the projected line in the pixel matrix are known. In the next method step, these pixel co-ordinates are transformed into object co-ordinates.

Figure 8:
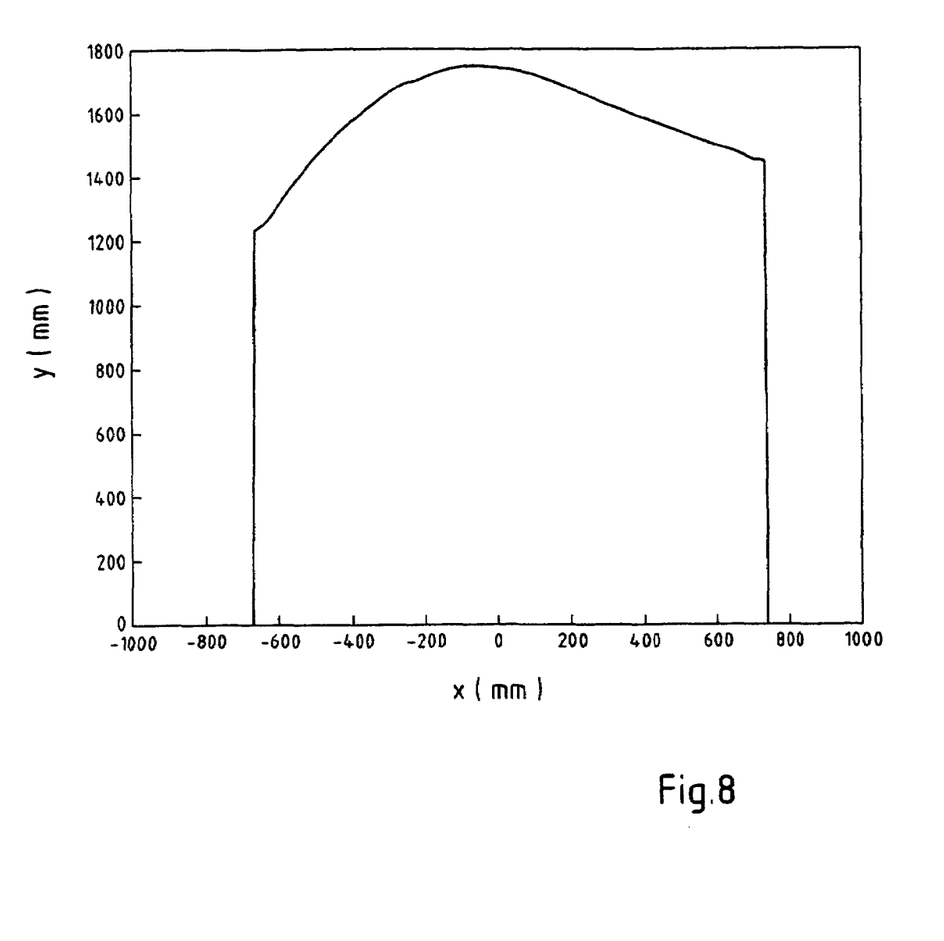

Accordingly, the object co-ordinates of the projected line, i.e. the co-ordinates related to a reference line located in the real surroundings or a zero line are known. In this situation, a y-value pertains in object co-ordinates for each pixel in X-pixel co-ordinates. Accordingly, the projected line does not lie over equidistant support points in the x-direction in object co-ordinates. A corresponding correction can be determined by linear interpolation from the values determined, so that the object co-ordinates are present in equidistant support points in the x-direction (FIG. 8).

Finally, the y-values are still to be normed in space with the height of the reference line. The reference line is derived from a measurement with a straight plate or the like. The reference height is then to be subtracted from the y-values of the object co-ordinates which have been determined.

The invention claimed is:

1. A method for the geometric measurement of a material strip (2) comprising:
    determining the strip thickness of the material strip at at least one measurement point (12) in the material strip (2) by means of a first measuring device,
    determining the shape and spatial location of the material strip (2) relative to a reference position by means of a second measuring device, and
    carrying out a correction of the measured values of the first measuring device by the measured values of the second measuring device,
    wherein on the surface of the material strip (2), with the second measuring device being an optical projection device (13), at least one line is projected, running essentially perpendicular to the longitudinal direction of the material strip, wherein the projected line is detected by means of a camera (14), and wherein from a minimum of one line recorded by the camera (14), the shape and spatial location of the material strip (2) along the projected line is determined.

2. The method according to claim 1,
    wherein the material strip (2) is penetrated at a minimum of one measurement point (12) by radiation (10, 11) from at least one radiation source (6, 7) and
    wherein a reduction in the intensity of the radiation (10, 11) caused by the material strip (2) is determined by at least one detector (8, 9).

3. The method according to claim 2,
    wherein the measured values are recorded at a plurality of measurement points (12), whereby the measurement points are arranged at a distance transverse to the longitudinal direction of the material strip (2),
    wherein at predetermined intervals in the longitudinal direction, a series of measurements essentially comprising all the measurement points (12) are recorded, and
    wherein the thickness of the material strip (2) is calculated for each measurement point (12) acquired.

4. The method according to claim 2,
    wherein each measurement point (12) is acquired by at least two detectors (8, 9), which detect radiation (10, 11) at different spatial angles.

5. The method according to claim 1, wherein a minimum of one line created by the projection device (13) is aligned in such a way that said minimum of one line created by the projection device runs through a minimum of one measurement point (12) of the first measuring device.

6. The method according to claim 1,
    wherein a grid of lines is projected, located at a distance from one another in the longitudinal direction of the material strip (2),
    wherein the grid of lines is recorded with a camera (20), and
    on a basis of an evaluation of the shape of the grid of lines, the shape and spatial location of the material strip (2) is determined at least partially in the area of the material strip (2) comprised by the grid of lines.

7. The method according to claim 1, wherein the longitudinal contour and transverse contour of the material strip (2) are calculated from the measured values of the second measuring device.

8. The method according to claim 7, wherein the position of a minimum of one measuring point (12) inside the material strip (2) is determined by the measured spatial location and shape of the material strip (2) relative to the reference position.

9. The method according to claim 1,
    wherein the projected line is detected in pixel matrix of the camera (14),
    wherein the projected line is extracted from the pixel matrix and corresponding pixel co-ordinates are determined,
    wherein the pixel co-ordinates are transformed into object co-ordinates, and
    wherein the object co-ordinates are interpolated onto equidistant support points and referenced relative to the reference position.

10. The method according to claim 9,
    wherein for the detection of the projected line in the pixel matrix, an upper range and a lower range is determined for each pixel, seen in the Y-pixel co-ordinates,
    wherein a mean grey value is determined for the upper range and the lower range,
    wherein the greater of the mean grey values of the upper range and the lower range is determined, and
    when the grey value of a pixel under consideration is higher by a predetermined amount above the greater mean grey value, the pixel under consideration is selected.

11. The method according to claim 10,
    wherein after the extraction of the projected line from the pixel matrix, small gaps between grouped and selected pixels are filled, and
    wherein a weighting process takes place in such a way that each pixel in a weighing image has a number of selected pixels associated with said each pixel, as a grey value.

12. The method according to claim 11,
    wherein for the extracting of the projected line from the weighting image and the original image, for each X-pixel co-ordinate, a vector is determined which describes a point on the projected line.

13. The method according to claim 1,
    wherein the spatial positions of the edges of the material strip are measured, and
    wherein the corrected actual width of the material strip (2) is calculated from the spatial position of the edges of the material strip (2) and the determined transverse contour of the material strip (2).

14. A device for the geometric measurement of a material strip (2) comprising:
- a first measuring device for the determination of the strip thickness in at least one measurement point (12) arranged in the material strip (2),
- a first evaluation means for the evaluation of the measured values recorded by the first measuring device,
- a second measuring device for the determination of the shape and spatial location of the material strip (2) relative to a reference position,
- a second evaluation means for the evaluation of the measured values recorded by the second measuring device, and
- a correction means for correcting the measured values of the first measuring device by the measured values of the second measuring device,
- wherein the second measuring device comprises a projection device (13), the projection device (13) projects a line onto the surface of the material strip (2) and wherein the second measuring means comprises a camera (14) for the acquisition of the projected line in a pixel matrix.

15. The device according to claim 14, wherein
the first measuring device comprises at least one radiation source (6, 7) and at least one detector (8, 9),
whereby a radiation section, detected by the minimum of one detector (8, 9), of the radiation generated by the radiation source (6, 7) defines a measurement point (12) arranged in the material strip (2).

16. The device according to claim 15, wherein
the first measuring device comprises at least two radiation sources (10, 11), which are arranged transverse to the longitudinal direction of the material strip and at a distance from one another,
wherein the first measuring device comprises a plurality of detectors (8, 9), which are arranged transverse to the longitudinal direction of the material strip and at a distance from the radiation sources (10, 11),
wherein the material strip (2) is arranged between the radiation sources (10, 11) and the detectors (8, 9),
wherein the first evaluation means evaluate the measured values recorded by the detectors (8, 9),
wherein two detectors (8, 9) are aligned on two different radiation sources (10, 11), and form a pair of detectors (8, 9),
wherein axes formed by the detectors (8, 9), and the radiation sources (10, 11) intersect essentially in the area of the material strip (2) and a measurement point is therefore specified, and
wherein the first evaluation means evaluate from the measured values the thickness of the material strip (2) in the measurement points (12).

17. The device according to claim 14, wherein a light beam generated by the projection device (13) runs through a minimum of one measuring point (12) of the first measuring device.

18. The device according to claim 14, wherein
the projection device projects a grid of lines onto the surface of the material strip (2), and
wherein the second measuring device comprises a camera (20) for the acquisition of the projected grid of lines.

19. The device according to claim 18, wherein one of the lines of the grid of lines runs through the minimum of one measurement point (12) of the first measuring device.

20. The device according to claim 14, wherein the projection device (13) is a laser source.

* * * * *